Figure 1:
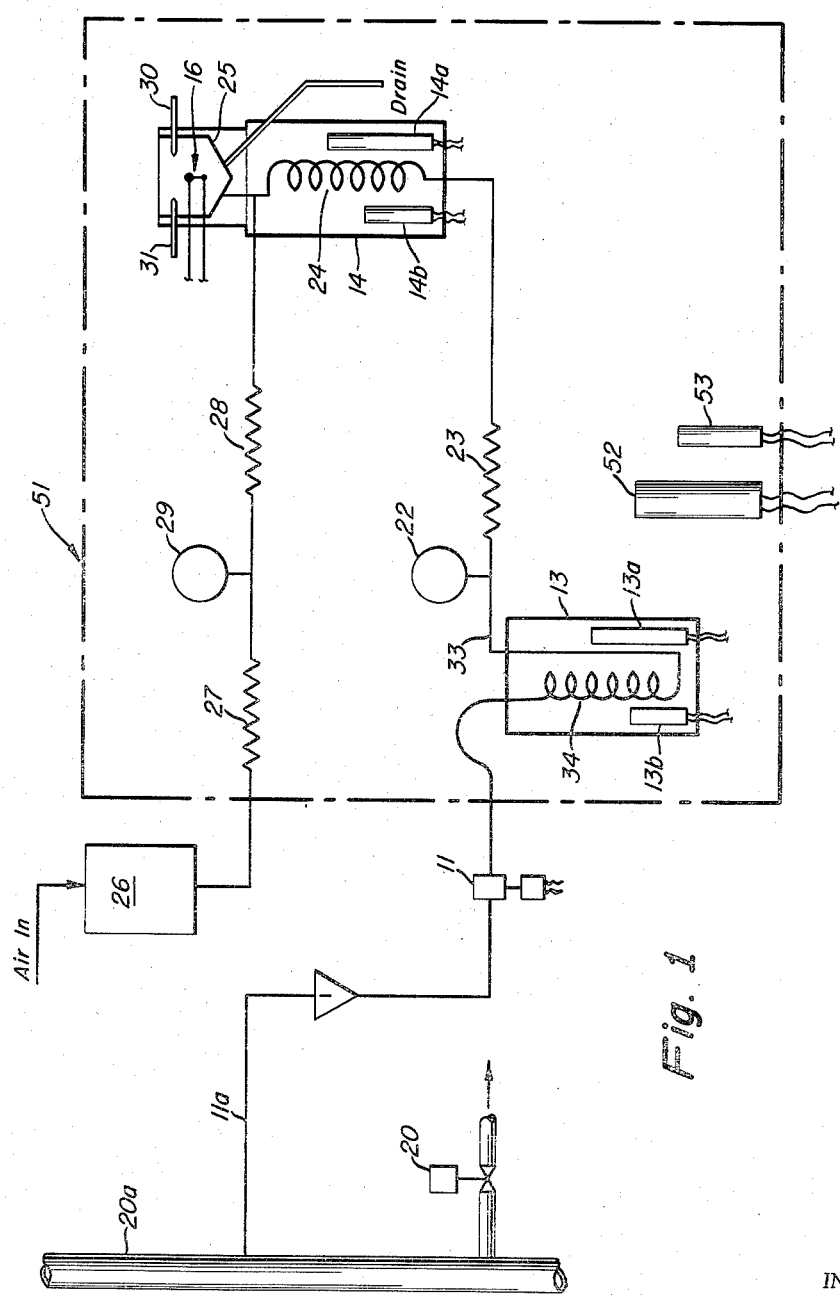

Feb. 14, 1961   J. C. RHODES ET AL   2,971,365
FLASH DETECTOR APPROVING DEVICE
Filed Dec. 18, 1957   2 Sheets-Sheet 1

INVENTORS:
Joseph C. Rhodes
Robert B. Jacobs
BY
ATTORNEY

Feb. 14, 1961  J. C. RHODES ET AL  2,971,365
FLASH DETECTOR APPROVING DEVICE
Filed Dec. 18, 1957  2 Sheets-Sheet 2

INVENTORS:
Joseph C. Rhodes
Robert B. Jacobs
BY
Everett A. Johnson
ATTORNEY

United States Patent Office 2,971,365
Patented Feb. 14, 1961

2,971,365
FLASH DETECTOR APPROVING DEVICE

Joseph C. Rhodes, Park Forest, and Robert B. Jacobs, Homewood, Ill., assignors to Standard Oil Company, Chicago, Ill., a corporation of Indiana Filed Dec. 18, 1957, Ser. No. 703,677

8 Claims. (Cl. 73—1)

This invention relates to flash point apparatus for use in connection with unattended pipeline deliveries to a bulk plant.

Product deliveries to a bulk plant are customarily made by truck or rail equipment. Normally the presence of the plant agent is required during receipt of the stock. Dependent on weather conditions and plant operation, considerable time and effort are required to handle this receipt. To permit unattended delivery of pipeline stock direct to bulk plant tankage, continuous flash point monitors have been provided for identifying the batches of products transported in a pipeline and for assuring that the flash point of a material being received is above some preselected minimum.

In one such system a sample liquid stream is passed into an enclosed cup provided with an overflow. Air is supplied to the cup, the comingled sample and air being exposed within the cup to an ignition means. The cup is maintained at a fixed temperature and when the flash point of the sample is below this temperature, vapors are ignited by the ignition means and the occurrence of a flash is detected. Relays for controlling delivery valves for turning a product into tankage are then actuated.

One form of flash detector comprises a pair of thermocouples within the vapor space above the liquid level within the flash chamber, one junction having a relatively large mass and thus a high heat capacity and the second junction being of low mass and low heat capacity. Both thermocouple junctions are exposed to the flash and when a flash occurs, one junction is rapidly heated and the second is substantially unaffected by the brief period of heating with the result that a differential in temperature occurs and the occurrence of a flash is indicated by the resulting voltage.

The flash point instrument does not measure flash point as such but may be essentially a "go, no-go" testing apparatus operated on a continuous basis to indicate whether the flash point of a given sample is above or below a selected specification value.

For example, when it is desired to deliver burning oils from a pipeline carrying both burning oils and gasoline, we may monitor the flash point of the pipeline product and when a product of a satisfactory flash point is encountered, it may be safely turned into tankage containing burning oils.

Such operations are generally satisfactory but it is recognized that since the delivery operation depends primarily upon the accuracy of the flash point determination, it is necessary to provide for determining whether the flash detecting means is operating properly and in the event of detected improper operation, for closing the valve that controls the delivery of product from the pipeline to the bulk plant. It is with respect to the detector approving device that this invention relates.

It is, therefore, an object of this invention to provide a system for checking and approving the flash detecting system employed in monitoring pipeline deliveries. It is a further object of the invention to provide a system for determining whether the flash detecting means operates properly. An additional object of the invention is to provide a system for automatically terminating the delivery of product from a pipeline in the event of a detector failure.

Another object of the invention is to provide an apparatus which is of rugged construction and which can operate unattended for long periods of time. A more specific object of the invention is to provide an apparatus for assuring that a flash tester of the type employing differential thermocouples for flash detection is working properly. These and other objects of the invention will become apparent as our description thereof proceeds.

Briefly, according to our invention, we provide a system for checking the operation of the flash detecting system. Periodically the sparking across the ignition electrodes is interrupted by a one-minute cycle timer. The timer then stops and a small voltage is placed in series with the flash detecting assembly, which comprises two thermocouples, one junction of low mass and one of high mass, and a sensitive relay. If these elements are in operative order, a second relay is actuated to restart the cycle timer and a third relay resets the sensitive relay in about 3 seconds. If a component fails and a flash occurs during the one-minute period between the checking operations, the sparking is automatically interrupted.

In the event that the detector circuit is defective, the sparking is also interrupted. When the sparking has been interrupted for whatever reason for 10 seconds, the tank filling valve is closed. After such a sequence, the instrument can only be restarted manually.

Figure 2:
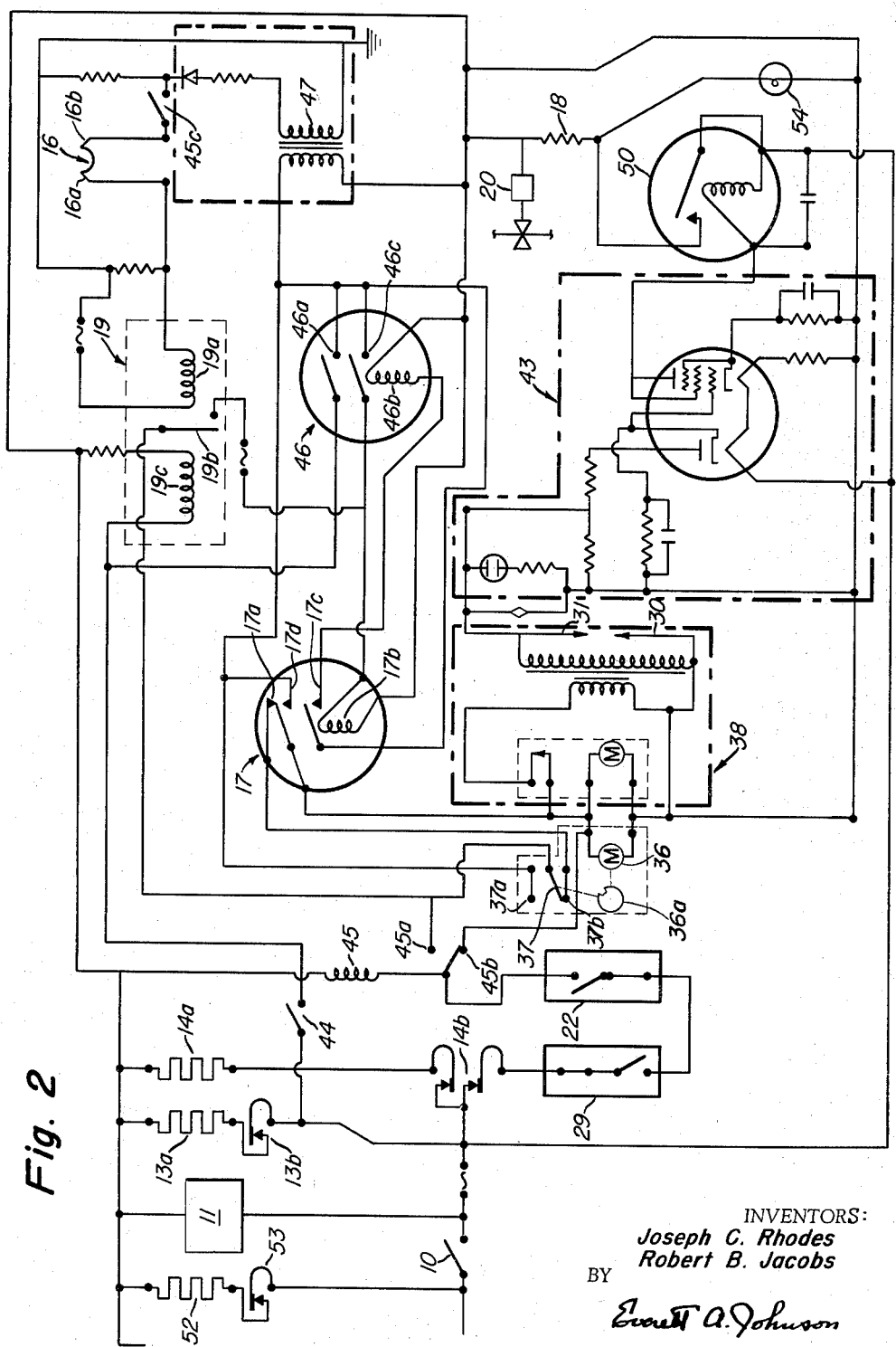

Further details and advantages of the invention will be described by reference to the accompanying drawings wherein:

Figure 1 is a schematic flow diagram of a flash point monitor embodying our invention; and Figure 2 is a schematic circuit diagram illustrating the flash detector approving components.

Referring to the drawings, the flash instrument is turned on by closing switch 10 and the pump 11 begins to deliver 60 cc./min. of sample into the flash testing system which includes a preheat block 13 and the main test block 14. The preheat heater 13a and the main block heater 14a are turned on and their temperatures begin to rise. When the temperature of the main block 14 reaches the reject point, a time delay relay 45 is actuated and in one minute the instrument will begin testing, provided that all operating conditions are satisfactory. The flash detector 15 comprises differential thermocouple 16 having large mass junction 16a and one small mass junction 16b and a sensitive locking relay 19.

At the end of the one-minute delay period, normal testing begins and after having approved the sample for about 30 seconds, a relay 19 operates which allows the main filling valve 20 at the station to open. If the product being tested has a flash point below the rejection point, a flash will occur in the test cup 25 and the filling valve 20 is immediately closed. Furthermore, if some part of the testing apparatus becomes defective, sparking will stop and relay 19 will be deactuated and close the main filling valve 20.

In order that the sample be approved and the relay 19 energized to allow the station main valve 20 to open, the following conditions must prevail:

(1) There must be an adequate feed to the instrument, i.e. the pump 11 must be in proper operation.

(2) The product must have a viscosity within the predetermined range so as to actuate the oil pressure switch 22 when the preheated product is pumped through the capillary flow resistance 23 en route to the heater coil 24 within the main test block 14.

(3) Air must be flowing into the test cup 25 at a rate of from 750–850 cc./min. as determined by pressure regulator 26, capillaries 27 and 28, such flow actuating the air pressure switch 29.

(4) The temperature of the main test block 14 must be at or above the reject point to close the inverse thermostat 14b.

(5) An intermittent spark must pass regularly between the spark electrodes 30 and 31 of the test cup 25.

(6) The flash detecting means including thermocouple junctions 16a and 16b, and sensitive relay 19 must be operating properly.

Referring to condition 2 above, a system for controlling the operation of the flash point instrument in response to the viscosity of the sample is described and claimed in a co-pending application entitled "Gasoline-Rejecting Mechanism for Continuous Flash Point Instrument." However, the sensing element for such a "viscosity cut-out" is the pressure switch 22 on sample line 33 located intermediate the preheat coil 34 and the flow resistance 23. The coil 34 and the resistance 23 are maintained within a temperature controlled zone. The size of resistance 23 and the actuating point of the pressure switch 22 are adjusted so that the switch 22 is open when burning oils are flowing in line 33 and is closed when gasoline is present. Thus the system discriminates between gasoline on the one hand and burning oils on the other by the differences in viscosities between the two types of materials under controlled temperature and feed rate conditions. This system is necessary since pure gasoline might form overrich mixtures which would not flash in the test cup 25. In itself it is not an adequate monitor since small amounts of gasoline in burning oil do not change the viscosity significantly but do change the flash point considerably.

When the switch 22 is in the open position, i.e. when burning oils are present, flash test system operates in the manner described. When the switch 22 is in the closed position, the sample may be diverted from the flash chamber by actuating solenoid-operated valves (not shown), the test and indicating circuits may be de-energized, or both means may be used to prevent the making of a flash test on the low flash sample.

To determine whether the flash detecting means is operative, a one r.p.m. cycle timer motor 36 is used to operate a single-pole, double-throw switch 37 by a cam 36a which is shaped so that the switch 37 is actuated for about 3 seconds during one revolution. When the switch 37 is actuated, power to the cycle timer motor 36 and the sparking assembly 38 through contact 17a of relay 17 is interrupted causing the cycle timer motor 36 and sparking to stop. Simultaneously power is supplied to isolation transformer 47 which in turn causes a small D.C. current to flow to the actuating winding 19a of sensitive relay 19 through the differential thermocouple 16. This current causes the sensitive relay 19 to actuate and its contacts 19b are closed sending currents to the actuating winding 17b of relay 17 whose contacts 17c in turn furnish power to the actuating winding 46b of relay 46. The contacts 17d of relay 17 send power from contacts 37a of switch 37 to cycle timer motor 36. The motor 36 begins to turn again and at the same time power is supplied to the reset coil 19c of the sensitive relay 19 through one of the contacts 46a of relay 46.

The reset coil 19c causes the contacts 19a of the sensitive relay 19 to open but relay 17 remains actuated since power is at the same time supplied to its actuating winding 17b through the second set of contacts 46c of relay 46. Since power has been supplied to the cycle timer motor 36 it will begin to turn and after about 3 seconds the single-pole double-throw switch 37 will be deactuated opening contact 37a and closing contact 37b. This in turn causes both relays 17 and 46 to deactuate and power is now fed to the cycle timer motor 36 through the contacts 37a of the switch 37.

Normal testing occurs only when the cycle timer motor 36 is running and during the brief period of about one second when the motor 36 is stopped, normal testing is interrupted. The rest of the circuit is designed so that an interruption of at least 6 seconds is required before the spark integrating circuit 43 indicates by a warning signal from relay 50 that the tester is inoperative. The warning signal (visually indicated by lamp 54) stops the filling operation by deactuating the relay 18 which in turn closes filling valve 20, and stops the tank filling operation.

The sequence of events described above occurs each minute during testing. If any of the components fails to operate correctly, the sequence is interrupted and the cycle motor 36 will not start. In particular, should the flash detector means including the differential thermocouple 16 be opened, then the sensitive relay 19 will not be actuated and the cycle timer motor 36 will not start again and the testing (and hence the tank filling) is interrupted.

If an explosion occurs in the test cut 25 at any time during the normal testing period (i.e. when the switch 37 is not actuated), the contacts 19b of the sensitive relay 19 are closed and the control relay 17 is actuated. Power to the cycle timer motor 36 is interrupted by the actuation of the control relay 17, the cycle timer motor 36 is stopped and cannot restart until the reset relay 19c is manually reset by closing switch 44.

During the warm up period, i.e. before the temperature of the main block 14 reaches the reject point, a film of oil may deposit on the electrodes 30 and 31 from splashing in the test cup 25. This film on the electrodes 30 and 31 may be heated by the first spark between the electrodes and if the flash point of the oil film is near the reject point, an explosion may occur causing the instrument to shut down although normal testing has not begun.

To prevent the flash point apparatus from operating the sensitive relay 19 during the first minute after the warm up, we provide the time delay relay 45. The contacts 45c of time delay relay 45 open the thermocouple flash detector circuit 15 during the first minute of testing operation after warm up and prevent the instrument from responding to a flash which may occur during this one-minute period before the sample has been heated in the test cup 25. The contacts 45b of time delay relay 45 furnish power to the sparking assembly during this one-minute period.

Reverting to Figure 1, the components indicated may be enclosed within an explosion-proof housing 51 provided with space heater 52 controlled by space thermostat 53. Also in Figure 1, line 11a diverts the sample via pump 11 to the instrument and solenoid-operated filling valve 20, when actuated as described, delivers flow from pipeline 20a to tankage (not shown).

Although our invention has been described in terms of preferred embodiments of the apparatus wherein flash point determinations are to be made, it should be understood that these are by way of illustration only and that the invention is not necessarily limited thereto. However, the device can be used wherever thermocouple circuits are employed and where it is important to detect the failure of the thermocouple and the circuit it operates. Alternative operating techniques and apparatus components will become apparent to those skilled in the art and accordingly, modifications in the apparatus and in the mode of using the apparatus are contemplated without departing from the spirit of the invention.

What we claim is:

1. In an apparatus for periodically checking the operation of a thermocouple circuit which comprises in combination cycle timer means, switch means actuated by said cycle timer means and interrupting said cycle timer means, voltage source means controlled by said switch means, circut means for applying said voltage source to said thermocouple circuit through said switch means, first relay means in electrical series with said thermocouple circuit actuatable by said applied voltage from said source, second relay means, said second relay means being actuated by said first relay means when the thermocouple circuit is in proper operating condition, second power source, said second power source being controlled by said second relay to restart said cycle timer means, and third relay means actuated upon the operation of the second relay to reset the said first relay means and to hold the said second relay actuated whereby power is applied to the said cycle timer means until said switch means is actuated, causing the deactuation of the third relay and in turn the deactuation of the second relay.

2. The apparatus of claim 1 wherein said cycle timer means includes cam means actuating said switch means and a motor associated with said cycle timer means controlled by said second relay.

3. In a flash point apparatus of the type employing sparking electrodes and differential thermocouple means for detecting the occurrence of a flash, the improved apparatus which comprises cycle timer means, switch means actuated by said cycle timer means causing interruption of said cycle timer means, a D.C. voltage source controlled by said switch means, means for applying said D.C. voltage source to said thermocouple means, a sensitive relay in series with said thermocouple means and adapted to be actuated by said D.C. voltage, a second relay means controlled by said first sensitive relay means, said second relay being adapted to apply power to said cycle timer means, and third relay means actuated upon the operation of the second relay to reset the said first relay means and to hold the said second relay actuated whereby power is applied to restart said cycle timer means.

4. The apparatus of claim 3 wherein the said cycle timer means includes a motor and a cam adapted to actuate said switch for relatively short periods of time and wherein said second relay controls said motor.

5. In a continuous flash point apparatus of the type including a flash chamber, means for flowing a sample liquid through the flash chamber, means for heating the sample liquid to a controlled temperature, electrode means for igniting vapors evolved from said liquid in said flash chamber, and thermocouple circuit means for detecting the occurrence of a flash in said chamber, the improved apparatus for checking the operation of the flash-detecting thermocouple circuit means which comprises in combination cycle timer means, switch means controlled by said cycle timer means, a voltage source controlled by said switch means, circuit means for applying said voltage to said thermocouple circuit means, a sensitive relay in said thermocouple circuit, second relay means actuatable by said sensitive relay when said thermocouple circuit is in proper operating condition and third relay means actuated upon operation of the second relay means to reset the said first relay means and to hold the said second relay actuated whereby power is applied to the said cycle timer means.

6. The improved apparatus of claim 5 which includes an electric motor for driving said cycle timer means, the power to said electric motor being controlled by said second relay means.

7. The improved apparatus of claim 5 which includes third relay means in series with said second relay means, said third relay means being actuatable by the occurrence of a flash thereby actuating the second relay to interrupt the power to the cycle timer motor.

8. In an apparatus for checking the operation of a flash detecting system employed in a continuous flash point apparatus, said flash point apparatus including a flash chamber, means for flowing a sample through the flash chamber, means for heating the flowing sample, electrode means for igniting vapors in said flash chamber, and differential thermocouple means for detecting the occurrence of a flash, the improvement which comprises a circuit means including cycle timer means for interrupting both the sparking between said electrode means and the cycle timer means, means for placing a small D.C. voltage in series with the said differential thermocouple means and a sensitive relay during such interruption, and a second relay adapted to restart said cycle timer means and the sparking between the electrode means, said second relay being actuated by said sensitive relay when the thermocouple means are in working order to reset the sensitive relay means.

References Cited in the file of this patent

UNITED STATES PATENTS

| | | |
|---|---|---|
| 2,576,892 | Stanton | Nov. 27, 1951 |
| 2,647,237 | Herbst | July 28, 1953 |
| 2,701,965 | Sherman | Feb. 15, 1955 |
| 2,746,286 | Greanias et al. | May 22, 1956 |